(12) United States Patent
Porter et al.

(10) Patent No.: US 11,402,869 B1
(45) Date of Patent: Aug. 2, 2022

(54) ELECTRONIC DEVICES HAVING DISPLAYS WITH ENHANCED OPTICAL UNIFORMITY

(71) Applicant: Apple Inc., Cupertino, CA (US)

(72) Inventors: Elizabeth C. Porter, Sunnyvale, CA (US); Yi Qiao, San Jose, CA (US); Jean-Pierre S. Guillou, Los Gatos, CA (US); Tyler R. Kakuda, Stockton, CA (US); Di Liu, San Jose, CA (US); Shawn R. Gettemy, San Martin, CA (US); Wei Lin, Santa Clara, CA (US); Shenglin Ye, Santa Clara, CA (US); Shubhaditya Majumdar, Santa Clara, CA (US); Christopher E. Glazowski, Santa Cruz, CA (US); Paul C. Kelley, San Francisco, CA (US); Michael J. Brown, Campbell, CA (US); Ian T. Clark, San Jose, CA (US); Salman Karbasi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 21 days.

(21) Appl. No.: 16/932,558

(22) Filed: Jul. 17, 2020

Related U.S. Application Data

(60) Provisional application No. 62/905,560, filed on Sep. 25, 2019.

(51) Int. Cl.
*G06F 1/16* (2006.01)
*F21V 8/00* (2006.01)
(Continued)

(52) U.S. Cl.
CPC ......... *G06F 1/1609* (2013.01); *G02B 6/0006* (2013.01); *G02B 6/08* (2013.01);
(Continued)

(58) Field of Classification Search
CPC ........ G02B 6/08; G02B 6/42; C03B 2203/02; C03B 2203/10
See application file for complete search history.

(56) References Cited

U.S. PATENT DOCUMENTS 10,488,584 B2  11/2019  Karafin et al.
10,551,628 B2   2/2020  Karafin et al.
(Continued)

*Primary Examiner* — Tina M Wong
(74) *Attorney, Agent, or Firm* — Treyz Law Group, P.C.; G. Victor Treyz; Tianyi He

(57) ABSTRACT

An electronic device may have a housing with a display. The display may be overlapped by an image transport layer such as a coherent fiber bundle or layer of Anderson localization material. The image transport layer may have an input surface that receives an image from the display and a corresponding output surface to which the image is transported. The input surface and output surface may have different shapes. During fabrication of the image transport layer, molding techniques, grinding and polishing techniques, and other processes are used to deform the image transport layer and the shape of the output surface. The area of peripheral portions of the output surface may expand relative to central portions. Optical uniformity across the output surface can be enhanced by maintaining uniformity in fiber core diameters and other attributes of the image transport layer across deformed and undeformed portions of the output surface.

21 Claims, 11 Drawing Sheets

(51) Int. Cl.
*G02B 6/08* (2006.01)
*G02B 6/42* (2006.01)

(52) U.S. Cl.
CPC ........ *G02B 6/4242* (2013.01); *C03B 2203/02* (2013.01); *C03B 2203/10* (2013.01); *G06F 1/163* (2013.01)

(56) References Cited

U.S. PATENT DOCUMENTS

| | | |
|---|---|---|
| 10,663,657 B2 | 5/2020 | Karafin et al. |
| 11,003,015 B1 * | 5/2021 | Qiao .................... G02F 1/13336 |
| 11,247,421 B1 * | 2/2022 | Gulgunje ......... B29D 11/00663 |
| 2014/0037257 A1 * | 2/2014 | Yang ........................ G02B 6/08 385/116 |
| 2015/0378094 A1 * | 12/2015 | Lu ............................ G02B 6/08 385/116 |
| 2016/0238785 A1 * | 8/2016 | Park ..................... G02B 6/0076 |
| 2018/0074639 A1 | 3/2018 | Powell et al. |
| 2018/0128973 A1 * | 5/2018 | Powell ................ H01L 51/5275 |
| 2019/0391326 A1 | 12/2019 | Yang et al. |

\* cited by examiner

US 11,402,869 B1

ELECTRONIC DEVICES HAVING DISPLAYS WITH ENHANCED OPTICAL UNIFORMITY

This application claims the benefit of provisional patent application No. 62/905,560, filed Sep. 25, 2019, which is hereby incorporated by reference herein in its entirety.

FIELD

This relates generally to electronic devices, and, more particularly, to electronic devices with displays.

BACKGROUND

Electronic devices may have displays. Displays have arrays of pixels for displaying images for a user. The shape of many displays can pose challenges during integration into an electronic device, particularly in situations where space is limited.

SUMMARY

An electronic device may have a housing with a display. The display may be overlapped by an image transport layer such as a coherent fiber bundle or layer of Anderson localization material. In some configurations, fibers in an image transport layer may be joined using Anderson localization material that serves as binder.

The image transport layer may have an input surface that receives an image from the display and a corresponding output surface to which the image is transported. The input surface and output surface may have different shapes. During fabrication of the image transport layer, molding techniques, grinding and polishing techniques, and other processes may be used to deform the image transport layer and therefore deform the shape of the output surface. For example, the periphery of the image transport layer may be stretched laterally outwards and provided with a cross-sectional profile that curves downwards at increasing distances from the center of the image transport layer. These operations may expand the area of the output surface in the periphery of the image transport layer relative to the area at the center of the image transport layer.

Optical uniformity across the output surface of an image transport layer can be enhanced by enhancing uniformity in fiber core diameters and other attributes across the output surface. With an illustrative configuration, the process of deforming the undeformed image transport layer primarily or exclusively expands a binder fraction associated with the fibers and does not impact fiber diameters. In another illustrative configuration, an undeformed block of image transport layer material is preconfigured so that when processed and deformed to form a final desired image transport layer shape, one or more attributes of the image transport layer are uniform across the output surface.

As an example, an undeformed image transport layer can be formed that has smaller fiber cores, thinner fiber claddings, and/or a smaller binder fraction near the periphery of the layer than in the center of the layer. When deformed by heat and pressure during molding and/or during grinding and polishing, the area of the output surface in the periphery expands. This increases fiber core diameters, fiber cladding thickness, and/or binder fraction. By configuring the variation of the attributes of the fibers and binder as a function of lateral position in an undeformed image transport layer, the resulting deformed image transport layer will have fiber and binder attributes that vary less across the output surface than in the undeformed image transport layer or that are uniform across the output surface.

DETAILED DESCRIPTION

An electronic device may have a display. The display may have an array of pixels for creating an image. The image may pass through a display cover layer that overlaps the array of pixels. To minimize display borders or to otherwise create a desired appearance for the display, the display cover layer may include an image transport layer. The image transport layer may have an input surface that receives an image from the array of pixels and a corresponding output surface to which the image is transported from the input surface. A user viewing the image transport layer will view the image from the array of pixels as being located on the output surface.

In configurations in which the input and output surfaces have different shapes, the image transport layer may be used to warp the image produced by the array of pixels. For example, the shape of the image can be transformed and the effective size of the image can be changed as the image passes through the image transport layer. In some configurations, edge portions of the image are stretched outwardly to help minimize display borders.

Image transport layers can be formed from coherent fiber bundles (sometimes referred to as fiber optic plates) and/or Anderson localization material. Glass and/or polymer may be used in forming image transport layer structures. To help protect the output surface of an image transport layer, an optional transparent protective layer may be included on the outer surface of the display cover layer. This transparent protective layer may be, for example, a glass plate, or a protective layer formed from other transparent material such as clear polymer or sapphire or other crystalline materials. In some arrangements, image transport layers and/or protective layers can be formed over components other than displays.

During processing, peripheral portions of an image transport layer material may be deformed. To compensate for excessive spreading out of fibers in deformed peripheral portions of an image transport layer, the image transport layer material can be provided with fibers of varying density.

Figure 1:
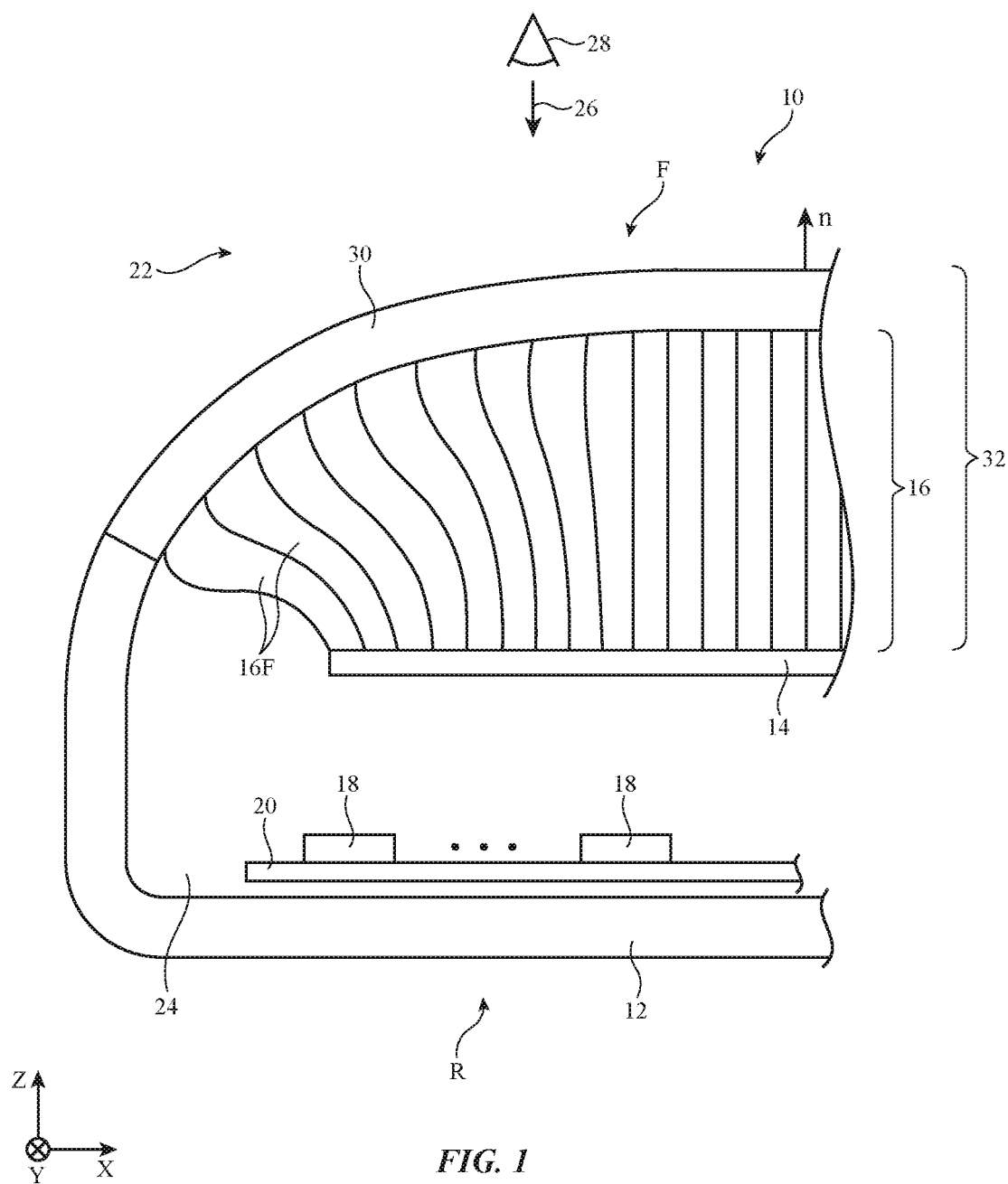
FIG. 1 is a side view of an illustrative electronic device with an image transport layer in accordance with an embodiment.

A cross-sectional side view of a portion of an illustrative electronic device with a display cover layer that includes an image transport layer is shown in FIG. 1. In the example of FIG. 1, device 10 is a portable device such as a cellular telephone, wristwatch, or tablet computer. In general, any type of electronic device may have an image transport layer such as a desktop computer, a voice-control speaker, a television or other non-portable display, a head-mounted device, an embedded system such as a system built into a vehicle or home, an electronic device accessory, and/or other electronic equipment.

Device 10 includes a housing such as housing 12. Housing 12 may be formed from polymer, metal, glass, crystalline material such as sapphire, ceramic, fabric, fibers, fiber composite material, natural materials such as wood and cotton, other materials, and/or combinations of such materials. Housing 12 may be configured to form housing walls. The housing walls may enclose one or more interior regions such as interior region 24 and may separate interior region 24 from exterior region 22. In some configurations, an opening may be formed in housing 12 for a data port, a power port, to accommodate audio components, or to accommodate other devices. Clear housing regions may be used to form optical component windows. Dielectric housing structures may be used to form radio-transparent areas for antennas and wireless power components.

Electrical components 18 may be mounted in interior region 24. Electrical components 18 may include integrated circuits, discrete components, light-emitting components, sensors, and/or other circuits and may, if desired, be interconnected using signal paths in one or more printed circuits such as printed circuit 20. If desired, one or more portions of the housing walls may be transparent (e.g., so that light associated with an image on a display or other light-emitting or light-detecting component can pass between interior region 24 and exterior region 22).

Electrical components 18 may include control circuitry. The control circuitry may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in the control circuitry may be used to control the operation of device 10. For example, the processing circuitry may use sensors and other input-output circuitry to gather input and to provide output and/or to transmit signals to external equipment. The processing circuitry may be based on one or more microprocessors, microcontrollers, digital signal processors, baseband processors, power management units, audio chips, application specific integrated circuits, etc. The control circuitry may include wired and/or wireless communications circuitry (e.g., antennas and associated radio-frequency transceiver circuitry such as cellular telephone communications circuitry, wireless local area network communications circuitry, etc.). The communications circuitry of the control circuitry may allow device 10 to communicate with other electronic devices. For example, the control circuitry (e.g., communications circuitry in the control circuitry) may be used to allow wired and/or wireless control commands and other communications to be conveyed between devices such as cellular telephones, tablet computers, laptop computers, desktop computers, head-mounted devices, handheld controllers, wristwatch devices, other wearable devices, keyboards, computer mice, remote controls, speakers, accessory displays, accessory cameras, and/or other electronic devices. Wireless communications circuitry may, for example, wirelessly transmit control signals and other information to external equipment in response to receiving user input or other input from sensors or other devices in components 18.

Input-output circuitry in components 18 of device 10 may be used to allow data to be supplied to device 10 and to allow data to be provided from device 10 to external devices. The input-output circuitry may include input devices that gather user input and other input and may include output devices that supply visual output, audible output, or other output.

Output may be provided using light-emitting diodes (e.g., crystalline semiconductor light-emitting diodes for status indicators and/or displays, organic light-emitting diodes in displays and other components), lasers, and other light-emitting devices, audio output devices (e.g., tone generators and/or speakers), haptic output devices (e.g., vibrators, electromagnetic actuators, piezoelectric actuators, and/or other equipment that supplies a user with haptic output), and other output devices.

The input-output circuitry of device 10 (e.g., the input-output circuitry of components 18) may include sensors. Sensors for device 10 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into a display, a two-dimensional capacitive touch sensor and/or a two-dimensional force sensor overlapping a display, and/or a touch sensor or force sensor that forms a button, trackpad, or other input device not associated with a display), and other sensors. Touch sensors for a display or for other touch components may be based on an array of capacitive touch sensor electrodes, acoustic touch sensor structures, resistive touch components, force-based touch sensor structures, a light-based touch sensor, or other suitable touch sensor arrangements. If desired, a display may have a force sensor for gathering force input (e.g., a two-dimensional force sensor may be used in gathering force input on a display).

If desired, the sensors may include optical sensors such as optical sensors that emit and detect light, optical touch sensors, optical proximity sensors, and/or other touch sensors and/or proximity sensors, monochromatic and color ambient light sensors, image sensors, fingerprint sensors, ultrasonic sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors (e.g., sensors that gather position information, three-dimensional radio-frequency images, and/or other information using radar principals or other radio-frequency sensing), depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors.

In some configurations, components 18 may include mechanical devices for gathering input (e.g., buttons, joysticks, scrolling wheels, key pads with movable keys, keyboards with movable keys, and other devices for gathering user input). During operation, device 10 may use sensors and/or other input-output devices in components 18 to gather user input (e.g., buttons may be used to gather button press input, touch and/or force sensors overlapping displays can be used for gathering user touch screen input and/or force input, touch pads and/or force sensors may be used in gathering touch and/or force input, microphones may be used for gathering audio input, etc.). The control circuitry of device 10 can then take action based on this gathered information (e.g., by transmitting the information over a wired or wireless path to external equipment, by supplying a user with output using a haptic output device, visual output device, an audio component, or other input-output device in housing 12, etc.).

If desired, electronic device 10 may include a battery or other energy storage device, connector ports for supporting wired communications with ancillary equipment and for receiving wired power, and other circuitry. In some configurations, device 10 may serve as an accessory and/or may include a wired and/or wireless accessory (e.g., a keyboard, computer mouse, remote control, trackpad, etc.).

Device 10 may include one or more displays such as display 14. The displays may, for example, include an organic light-emitting diode display, a liquid crystal display, a display having an array of pixels formed from respective light-emitting diodes (e.g., a pixel array having pixels with crystalline light-emitting diodes formed from respective light-emitting diode dies such as micro-light-emitting diode dies), and/or other displays. The displays may include rigid display structures and/or may be flexible displays. For example, a light-emitting diode display may have a polymer substrate that is sufficiently flexible to be bent. Display 14 may have a rectangular pixel array or a pixel array of another shape for displaying images for a user and may therefore sometimes be referred to as a pixel array. Display 14 may also sometimes be referred to as a display panel, display layer, or pixel layer. Each pixel array in device 10 may be mounted under a transparent housing structure (sometimes referred to as a transparent display cover layer).

In the example of FIG. 1, display (pixel array) 14 is mounted under display cover layer 32. Display cover layer 32 (which may be considered to form a portion of the housing of device 10), covers front face F of device 10. Configurations in which opposing rear face R of device 10 and/or sidewall portions of device 10 have transparent structures covering displays and other optical components may also be used.

As shown in FIG. 1, display cover layer 32 may include image transport layer 16 and protective layer 30. Protective layer 30 may be formed from a layer of glass, clear polymer, crystalline material such as sapphire or other crystalline material, and/or other transparent material. The presence of layer 30 may help protect the outer surface of layer 16 from scratches. If desired, layer 30 may be omitted (e.g., in configurations in which a thin-film protective coating is present on the outer surface of layer 16, in configurations in which layer 16 is formed from hard material such as glass, and/or in other configurations in which layer 16 is resistant to scratching). A layer of adhesive and/or other structures may be formed between protective layer 30 and image transport layer 16 and/or may be included elsewhere in the stack of layers on display 14.

During operation, the pixels of display 14 produce image light that passes through image transport layer 16. In configurations in which image transport layer 16 is formed from a coherent fiber bundle, image transport layer 16 has optical fibers 16F. The fibers or other optical structures of image transport layer structures such as image transport layer 16 transport light (e.g., image light and/or other light) from one surface (e.g., an input surface of layer 16 that faces display 14) to another (e.g., an output surface of layer 16 that faces viewer 28, who is viewing device 10 in direction 26). As the image presented to the input surface of layer 16 is transported to the output surface of layer 16, the integrity of the image light is preserved. This allows an image produced by an array of pixels to be transferred from an input surface of a first shape at a first location to an output surface with a different shape (e.g., a shape with a footprint that differs from that of the input surface, a shape with a curved cross-sectional profile, a shape with a region of compound curvature, and/or a shape with other desired features).

Image transport layer 16 may therefore move the location of an image and may optionally change the shape of the surface on which the image is presented. In effect, viewer 28 will view the image from display 14 as if the image were generated on the output surface of image transport layer 16. In arrangements in which the image from display 14 is warped (geometrically distorted) by image transport layer 16, digital pre-distortion techniques or other compensation techniques may be used to ensure that the final image viewed on the output surface of image transport layer 16 has a desired appearance. For example, the image on display 14 may be prewarped so that this prewarped image is warped by an equal and opposite amount upon passing through layer 16. In this way, the prewarped image is effectively unwarped by passage through layer 16 will not appear distorted on the output surface.

In configurations of the type shown in FIG. 1, device 10 may have four peripheral edges and a rectangular footprint when viewed in direction 26 or may have other suitable shapes. To help minimize the size of inactive display borders as a user is viewing front face F of device 10 as shown in FIG. 1, the shapes of fibers 16F along the periphery of layer 16 may be deformed outwardly as shown in FIG. 1. These fibers 16F each have an outwardly bent segment that bends away from surface normal n of the center of layer 30 (e.g., away from an axis parallel to the Z axis of FIG. 1) and each have an inwardly bent segment that bends back towards surface normal n to help direct output light towards viewer 28.

The deformed shapes of fibers 16F (and/or the corresponding deformations made to optical filaments in Anderson localization material in layer 16) may help distribute image light laterally outwards in the X-Y plane so that the effective size of display 14 is enlarged and the image produced by display 14 covers some or all of the sidewalls of housing 12 or other peripheral portions of device 10 when the image on front face F is being viewed by viewer 28. For example, the bent shapes of fibers 16F of FIG. 1 may help shift portion of the displayed image laterally outward in the X-Y plane along the edges and corners of device 10 to block the edges of device 10 from view. In some arrangements, the portions of fibers 16F at the outermost surface of layer 16 are oriented parallel or nearly parallel with viewing direction 26 and the Z axis of FIG. 1, which helps ensure that some or all of the light that has passed through layer 16 will travel in the Z direction and be viewable by viewer 28.

Figure 2:
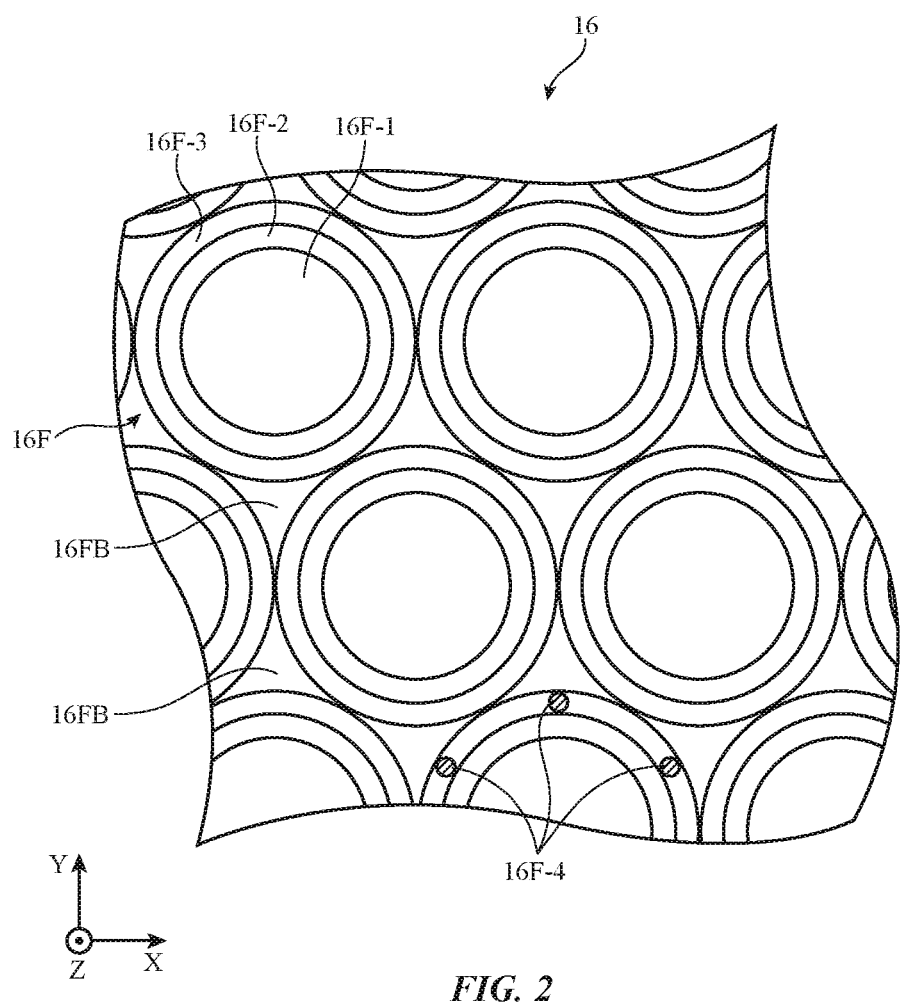
FIG. 2 is a cross-sectional view of a portion of an illustrative image transport layer formed using a coherent fiber bundle in accordance with an embodiment.

FIG. 2 is a cross-sectional view of a portion of image transport layer 16 in an illustrative configuration in which image transport layer 16 is formed from a coherent fiber bundle. Fibers 16F for layer 16 may have any suitable configuration. As shown in the example of FIG. 2, fibers 16F may each have a core such as core 16F-1. Cores 16F-1 and the other structures of image transport layer (e.g., cladding structures, binder, etc.) 16 may be formed from materials such as polymer, glass, crystalline material such as sapphire, and/or other materials. Some or all of these materials may be transparent. Arrangements in which some of the materials absorb light and/or have non-neutral colors or other light filtering properties may also be used.

Fiber cores 16F-1 may be formed from transparent material of a first refractive index and may be surrounded by cladding of a second, lower refractive index to promote light guiding in accordance with the principal of total internal reflection. In some arrangements, a single coating layer on cores 16F-1 may be used to form the cladding. In other arrangements, two or more coating layers on cores 16F-1 may be used to form the cladding. Clad fibers may be held together using binder 16FB, which serves to fill the interstitial spaces between the clad fibers. In some configurations, stray light absorbing material may be incorporated into layer 16 (e.g., into some of the cores, cladding, and/or binder). The stray light absorbing material may be, for example, polymer, glass, or other material into which light-absorbing material such as dye and/or pigment has been incorporated.

In an illustrative configuration, layer 16 may have inner coating layers 16F-2 that are formed directly on the outer surfaces of cores 16F-1 and outer coating layers 16F-3 that are formed directly on the outer surfaces of layers 16F-2. Additional coating layers (e.g., three or more coating layers) or fewer coating layers (e.g., a single coating layer) may be formed on fiber cores 16F-1, if desired. Stray light-absorbing material may be used in layers 16F-2 and/or 16F-3 or other coating layer(s) on cores 16F-1. In an illustrative arrangement, layers 16F-2 and 16F-3, which may sometimes be referred to as forming first and second cladding portions (or first and second claddings) of the claddings for fiber cores 16F-1, may respectively be formed from transparent material and stray light-absorbing material. Other arrangements may be used, if desired (e.g., arrangements in which stray light absorbing material is incorporated into some or all of binder 16FB, arrangements in which cores 16F-1 are coated with inner and outer transparent claddings and an interposed intermediate stray-light-absorbing cladding, arrangements in which cores 16F-1 are covered with a single stray-light-absorbing cladding, arrangements in which some or all of fibers 16F are provided with longitudinally extending filaments 16F-4 of stray light absorbing material located, for example, on or in any of the cladding layers, etc.).

In configuration in which fibers 16F have claddings formed from two or more separate cladding layers, the cladding layers may have the same index of refraction or the outermost layers may have lower refractive index values (as examples). Binder 16FB may have a refractive index equal to the refractive index of the cladding material or lower than the refractive index of the cladding material to promote total internal reflection (as examples). For example, each fiber core 16F-1 may have a first index of refraction and the cladding material surrounding that core may have a second index of refraction that is lower than the first index of refraction by an index difference of at least 0.05, at least 0.1, at least 0.15, at least 10%, at least 20%, less than 50%, less than 30%, or other suitable amount. The binder refractive index may be the same as that of some or all of the cladding material or may be lower than the lowest refractive index of the cladding by an index difference of at least 0.05, at least 0.1, at least 0.15, at least 10%, at least 20%, less than 50%, less than 30%, or other suitable amount.

The diameters of cores 16F-1 may be, for example, at least 5 microns, at least 7 microns, at least 8 microns, at least 9 microns, less than 40 microns, less than 17 microns, less than 14 microns, less than 11 microns, or other suitable diameter. Fibers 16F (including cores and claddings) may have diameters of at least 6 microns, at least 7 microns, at least 8 microns, at least 9 microns, less than 50 microns, less than 17 microns, less than 14 microns, less than 11 microns, or other suitable diameter.

Fibers 16F may generally extend parallel to each other in image transport layer 16 (e.g., the fibers may run next to each other along the direction of light propagation through the fiber bundle). This allows image light or other light that is presented at the input surface to layer 16 to be conveyed to the output surface of layer 16.

If desired, image transport layer 16 may be formed from Anderson localization material in addition to or instead of fibers 16F. Anderson localization material is characterized by transversely random refractive index features (higher index regions and lower index regions) of about two wavelengths in lateral size that are configured to exhibit two-dimensional transverse Anderson localization of light (e.g., the light output from the display of device 10). These refractive index variations are longitudinally invariant (e.g., along the direction of light propagation, perpendicular to the surface normal of a layer of Anderson localization material).

Figure 3:
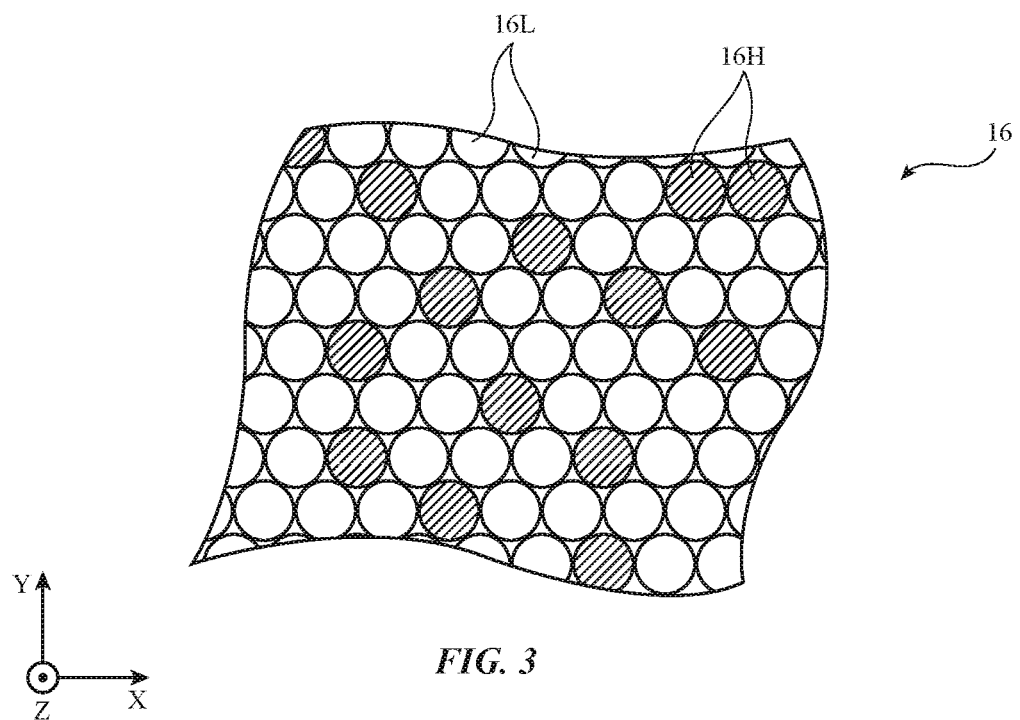
FIG. 3 is a cross-sectional view of a portion of an illustrative image transport layer formed using Anderson localization material in accordance with an embodiment.

FIG. 3 is a cross-sectional view of a portion of an image transport layer formed from Anderson localization material. In the example of FIG. 3, image transport layer 16 includes a random (pseudorandom) set of elongated optical structures of different refractive index values. These structures may, for example, be optical filaments that run into and out of the page of FIG. 3 and that have different refractive index values such as first filaments 16H with higher refractive index values and second filaments 16L with lower refractive index values. The refractive indices of filaments 16L and 16H may differ by any suitable amount (e.g., by at least 0.05, at least 0.1, at least 0.2, at least 0.3, by less than 0.8, etc.). The filaments may be distributed laterally (in dimensions X and Y) with a random pattern and may have any suitable cross-sectional shape (circular, rectangular, etc.). Anderson localization material preforms can be formed by drawing and assembling individual filaments of different refractive index values into bundles and/or can be formed by extruding lengths of material that include laterally interspersed areas of different respective refractive index values. Preforms can then be formed into layer 16 using one or more fusing and drawing operations. Other fabrication techniques may be used, if desired. To absorb stray light within an image transport layer formed from Anderson localization material, the Anderson localization material may include light absorbing material (e.g., light-absorbing filaments interspersed with transparent filaments or other light-absorbing structures).

Figure 4:
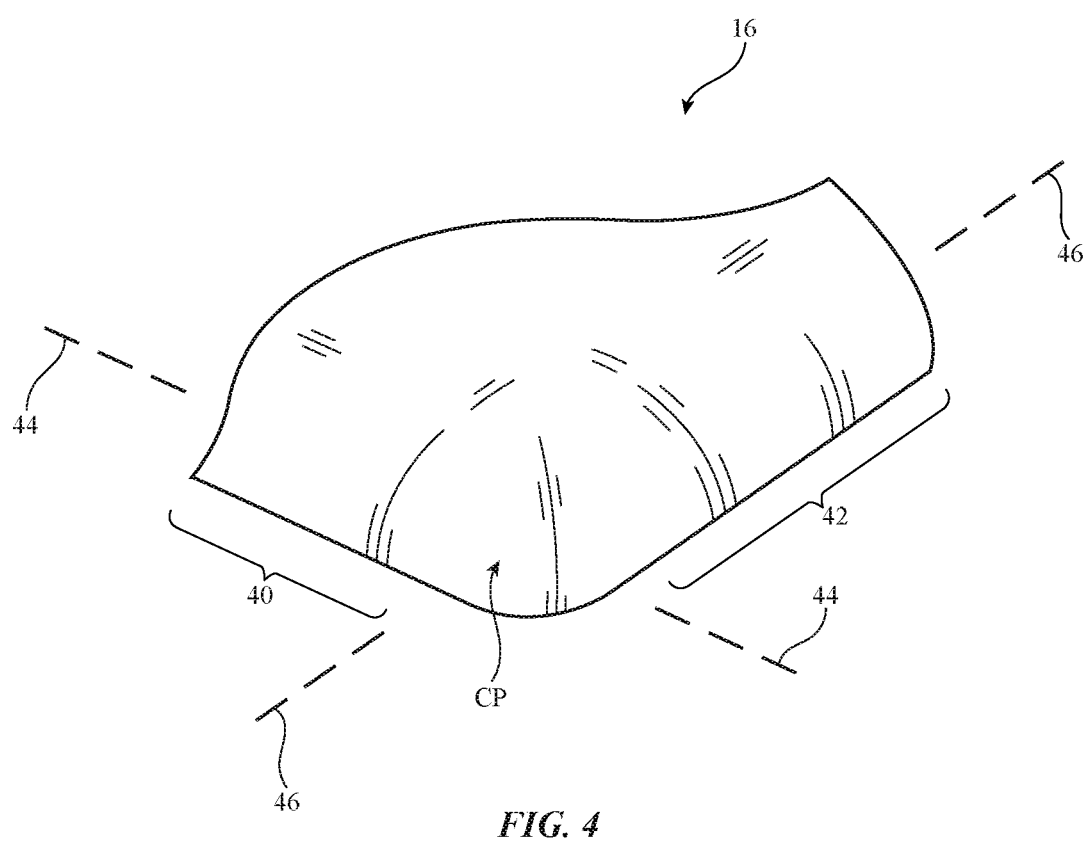
FIG. 4 is a perspective view of a portion of an image transport layer surface with compound curvature in accordance with an embodiment.

Image transport layers can be used to transport an image from a first surface (e.g., the surface of a pixel array) to a second surface (e.g., a surface in device 10 with compound curvature or other curved and/or planar surface shape) while preserving the integrity of the image. A perspective view of an illustrative corner portion of image transport layer 16 is shown in FIG. 4. In the example of FIG. 4, device 10 has edge portions 40 and 42 with surfaces that curve about axes 44 and 46, respectively. These portions of layer 16 may extend parallel to the straight sides of device 10 (as an example) and are characterized by curved surfaces that can be flattened into a plane without distortion (sometimes referred to as developable surfaces). At the corner of image transport layer 16 of FIG. 4, image transport layer 16 has curved surface portions CP with compound curvature (e.g., a surface that can only be flattened into a plane with distortion, sometimes referred to as a surface with Gaussian curvature). In a rectangular layout with curved corners, image transport layer 16 may have four corners with compound curvature. Image transport layers of other shapes (e.g., circular outlines, etc.) may also have surfaces with compound curvature (e.g., dome-shaped surfaces). When overlapped by protective layer 30, the overlapping portions of protective layer 30 may have corresponding surfaces with compound curvature. When selecting the size and shape of the output surface of layer 16 and therefore the size and shape of the image presented on the output surface, the use of an image transport layer material with compound curvature can provide design flexibility.

Figure 5:
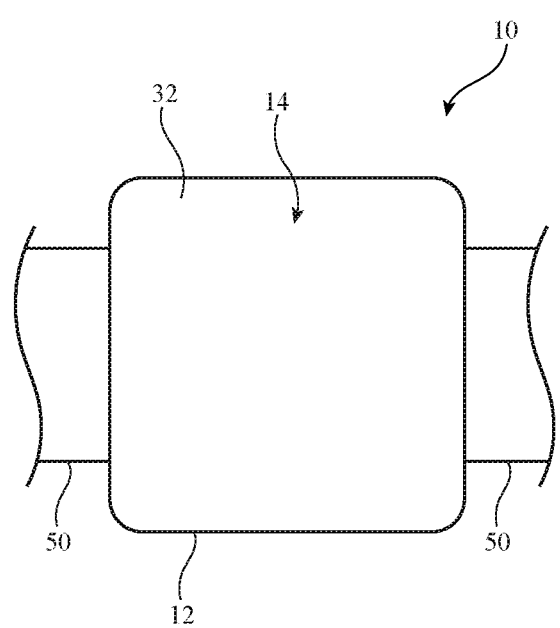
FIG. 5 is a top view of an illustrative electronic device in accordance with an embodiment.

In some arrangements, device 10 may include support structures such as wearable support structures. This allows device 10 to be worn on a body part of a user (e.g., the user's wrist, arm, head, leg, or other portion of the user's body). As an example, device 10 may include a wearable band, such as band 50 of FIG. 5. Band 50, which may sometimes be referred to as a wristband, wrist strap, or wristwatch band, may be formed from polymer, metal, fabric, leather or other natural materials, and/or other material, may have links, may stretch, may be attached to housing 12 in a fixed arrangement, may be detachably coupled to housing 12, may have a single segment or multiple segments joined by a clasp, and/or may have other features that facilitate the wearing of device 10 on a user's wrist.

In devices such as device 10 of FIG. 1 in which the output surface of image transport layer 16 extends laterally outwards near the periphery of device 10 to help hide overlapped peripheral device structures from view by viewer 28, the surface of the image transport layer output surface at the edge of device 10 is expanded relative to the surface of the image transport layer output surface in the center of device 10. Depending on the type of processing technique used in forming the image transport layer, the process of expanding the edge portions of the output surface may tend to alter the diameter of cores 16F-1, the fraction of the surface area occupied by binder relative to fibers 16F (sometimes referred to as binder fraction) and/or cladding thickness.

Figure 6:
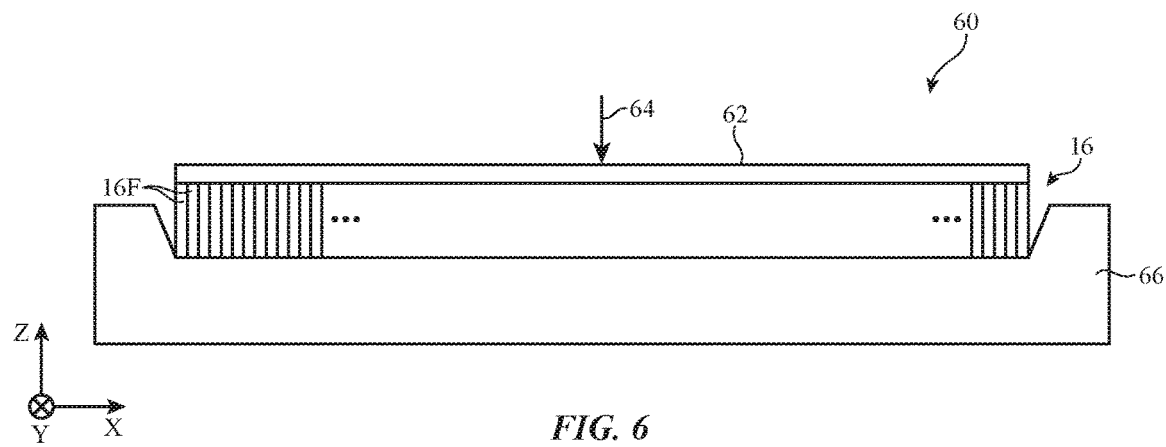
FIG. 6 is a side view of an illustrative undeformed image transport layer before processing in accordance with an embodiment.
Figure 7:
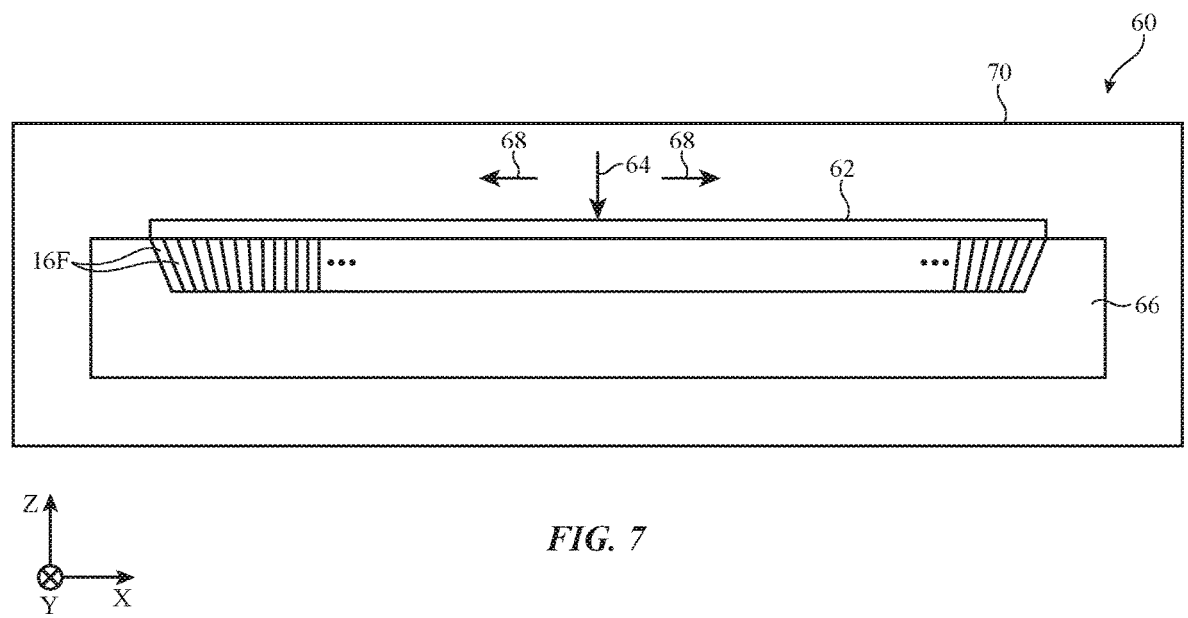
FIG. 7 is a side view of the illustrative image transport layer of FIG. 6 during processing to expand the output surface of the layer in accordance with an embodiment.

It is generally desirable to preserve optical quality at the edges of image transport layer 16 even when layer 16 is formed using processing operations that expand the surface of layer 16 in peripheral portions of layer 16. With one illustrative technique, a piezoelectric actuator or other electrically controlled actuator may be used in deforming layer 16 during processing. This type of arrangement is shown in FIGS. 6 and 7. Initially, as shown in FIG. 6, a layer of material for image transport layer 16 (e.g., a fiber optic plate) may be provided in an undeformed state (e.g., a state in which fibers 16F run parallel to the Z axis). Layer 16 of FIG. 6 may be placed in mold 66 and covered with linear actuator 62. Actuator 62 may receive control signals at input 64 (e.g., from a controller in processing system 60). Actuator 62 may be, for example, a piezoelectric actuator or other electrically controlled actuator (e.g., an electromagnetic actuator) that can expand laterally (along the X and/or Y directions) in response to control signals on input 64.

After placing layer 16 of FIG. 6 in mold 66 and attaching actuator 62 to the upper surface of layer 16, mold 66, actuator 62, and layer 16 may be placed in a processing tool such as processing tool 70 of FIG. 7. In an illustrative configuration, processing tool 70 is an oven. Application of heat from the oven allows layer 16 to deform when actuator 62 is expanded laterally (in the X-Y plane). For example, as shown in FIG. 7, the upper surface of layer 16 may be expanded outwardly in directions 68 parallel to the X axis). This spreads fibers 16 apart at the output surface to form an image transport layer with an output surface that is laterally expanded relative to its input surface as shown in FIG. 7.

During the spreading operations of FIG. 7, the amount of heat applied to layer 16 may be sufficient to raise layer 16 to a temperature sufficient to soften the material of layer 16 and thereby allow the structures of layer 16 to expand (e.g., so that the output surface can be spread apart relative to the input surface by actuator 62). This temperature may be, for example, the glass transition temperature of the binder, cladding, and/or core material of layer 16.

If desired, the cores of fibers 16F may be formed from material with a higher glass transition temperature than the binder (and, if desired, cladding) of layer 16 that is used to join fibers 16F together. This allows the binder to flow and/or otherwise be deformed during output surface expansion operations while fiber core size is maintained.

Maintaining the fiber cores (and, if desired, fiber claddings) of the image transport layer relatively unchanged during image transport layer processing may help preserve the numerical aperture of fibers 16F and other optical properties of layer 16 on the output surface near the periphery of layer 16. This may ensure that the angular spread of the light being emitted from each of fibers 16F at the output surface of layer 16 is relatively constant across the output surface and may otherwise help to equalize the performance and appearance of the image light being emitted by the output surface across the output surface. If desired, fibers 16F may be spread apart while binder 16FB is in a liquid state (e.g., when precursor material for a polymer used in forming binder 16FB is uncured). After expansion, tool 70 may cure the expanded binder by applying heat, light, etc. With this arrangement, most or all deformation is accommodated by expanding the polymer binder in layer 16 (e.g., the binder fraction increases in the deformed peripheral portions of the output surface).

Figure 8:
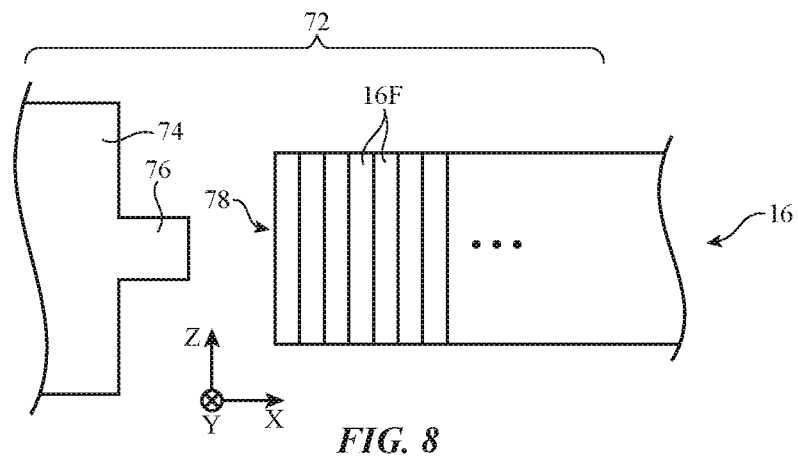
FIG. 8 is a cross-sectional side view of an illustrative mold structure and associated undeformed image transport layer before processing in accordance with an embodiment.
Figure 9:
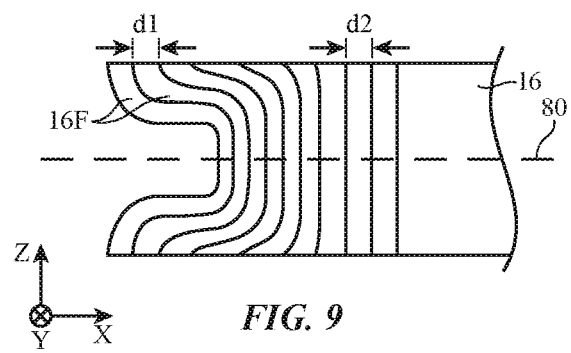
FIG. 9 is a cross-sectional side view of the image transport layer of FIG. 8 after processing with the mold structure in accordance with an embodiment.

If desired, image transport layer 16 may be deformed into a desired shape using heat and pressure applied by mold structures such as illustrative mold 74 of FIG. 8. The sides of mold 74 may have respective protrusions 76. When pressed inwardly against the outer edge of an undeformed layer of image transport layer material, fibers 16F will deform inwardly as shown in FIG. 9. Image transport layer 16 may then be cut from the deformed structure (e.g., along a cut line such as line 80) and polished. If desired, a curved surface profile may be formed along the periphery of layer 16 so that layer 16 has the curved edge appearance of layer 16 of FIG. 1 (e.g., by grinding and polishing, etc.). In the example of FIG. 9, the output surface of layer 16 is flat.

Due to the deformation imposed on the output surface of layer 16 by protrusion 76 of mold 74 and/or deformation imposed on the output surface of layer 16 due to changes in the curvature of layer 16 due to grinding and polishing, the output surface of layer 16 is larger than the input surface of layer 16. In particular, near the periphery of layer 16, the output surface area is expanded relative to the center of layer 16, which deforms fibers 16F and binder 16FB. As an example, fiber core area may increase, cladding thickness may increase, and binder fraction may increase along the expanded edge portion of the output surface relative to the unexpanded center portion of the output surface. Changes in the fibers and binder of image transport layer 16 such as these may affect image quality (e.g., the magnitude of light output, the angular spread of light output, etc.).

Changes to image quality from the output surface along the peripheral portions of image transport layer 16 may be visible to a user. For example, a user may observe more scattered light or a change in image intensity in these peripheral portions. To avoid visible artifacts due to the processing of image transport layer 16, the fibers and binder of the undeformed image transport layer can be configured to counteract the changes that are expected to be induced during processing (e.g., the changes that are expected in the output surface due to deformation from molding, deformation from surface grinding and polishing, deformation due to expansion with a piezoelectric actuator or other actuator, etc.).

Figure 10:
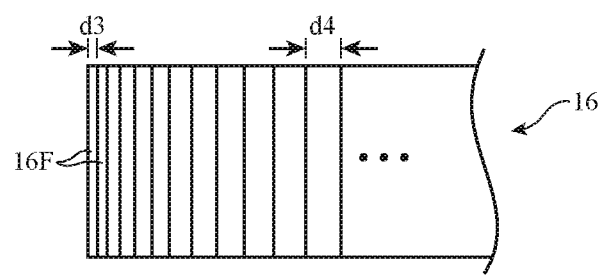
FIG. 10 is a cross-sectional side view of an illustrative image transport layer in which image transport layer properties such as fiber and binder properties have been varied along one or more lateral dimensions across the image transport layer prior to processing in accordance with an embodiment.
Figure 11:
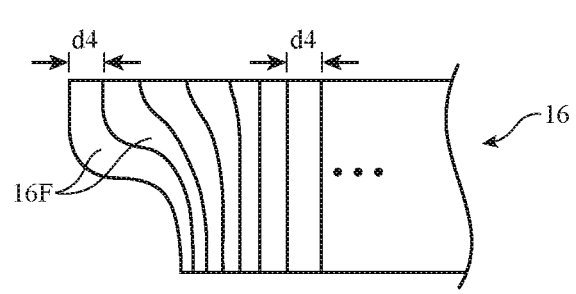
FIG. 11 is a cross-sectional side view of the image transport layer of FIG. 10 after processing in accordance with an embodiment.

As shown in FIG. 10, for example, the diameter of fibers 16F near the periphery of layer 16 (fiber diameter d3) may be smaller than the diameter of fibers 16F near the center of layer 16 (fiber diameter d4). Fiber diameter may, as an example, be decreased as a function if increasing lateral distance away from the center of layer 16 towards the periphery of layer 16. Other attributes besides fiber diameter may be varied in this way, if desired. Examples of other attributes of layer 16 that can be varied as a function of lateral position across layer 16 (e.g., decreased at increasing distances from the center of layer 16 towards the edge of layer 16) prior to molding operations include, for example, fiber density per unit area (e.g., the number of fiber cores per unit area), fiber core diameter, cladding thickness, binder fraction, two or more of these attributes, three or more of these attributes, and/or other attributes. As shown in FIG. 11, by configuring the undeformed image transport layer so that fiber diameters are smaller (d3) near the periphery of the undeformed layer, the deformed version of image transport layer 16 that is formed during subsequent molding operations will have fiber diameters that are equal or nearly equal across the entire output surface of the image transport layer. Other properties of layer 16 may likewise be uniform or nearly uniform across the output surface. In the present example, an illustrative deformed version of preconfigured image transport layer 16 of FIG. 10 is shown in FIG. 11. As shown in FIG. 11, the small diameter fibers near the periphery of the layer are expanded and have an expanded diameter d4 after molding operations. This expanded diameter may be equal to or nearly equal to the diameter of the fibers in the center of the processed image transport layer of FIG. 11 (e.g., the fibers at the output surface of the image transport layer of FIG. 11 may all have diameter d4, thereby ensuring that the image presented on the output surface of image transport layer 16 is satisfactory).

Figure 12:
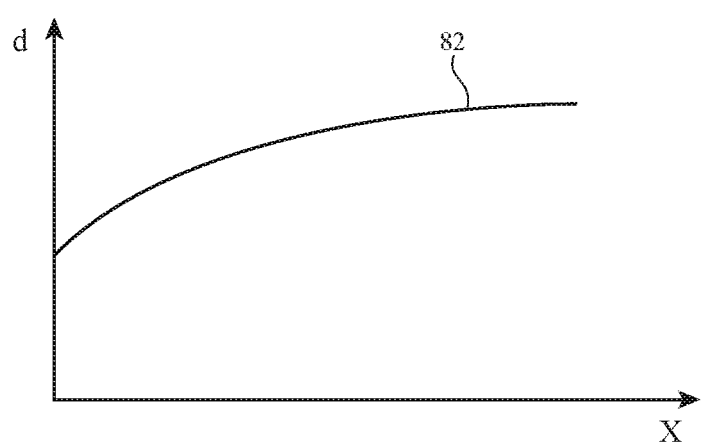
FIG. 12 is a graph showing how a property may be varied as a function of lateral position in image transport layer material prior to molding or otherwise processing the image transport layer material to form an image transport layer in accordance with an embodiment.

FIG. 12 is a graph showing how diameter d of fibers 16F in the undeformed version of layer 16 may vary as a function of lateral position x. As shown by curve 82 of the graph of FIG. 12, the fibers may initially (before molding or other processing) have diameters that are smaller at the periphery of layer 16 than near the center of layer 16. Diameter d may, as an example, decrease smoothly (or discontinuously) as a function of increasing distance towards the edge of layer 16 (x=0) away from the center of layer 16. The attributes of the fibers and binder may, as an example, be changed as a function of lateral position by assembling layer 16 from a series of small fiber bundles each of which has attributes selected based on its lateral position.

Figure 13:
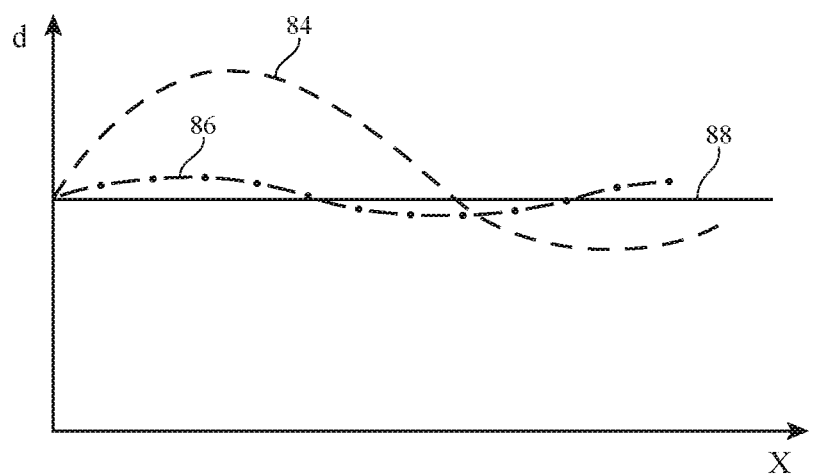
FIG. 13 is a graph in which illustrative material properties of image transport layers have been plotted as a function of lateral position across the image transport layer in accordance with an embodiment.

Following processing of a layer with varying fiber diameter d of FIG. 12, fiber diameter d on the output surface of image transport layer 16 may be characterized by a flatter curve such as curve 88 of FIG. 13 (in which diameter d is constant across layer 16) or curve 86 (in which diameter d varies by a relatively small amount (e.g., less than 10%, less than 5%, less than 2%, or other small value) laterally across the output surface of layer 16. In contrast, image transport layer material that is initially laterally uniform will tend to deform into an image transport layer with laterally varying attributes (e.g., fiber diameters that follow a curve such as curve 84 of FIG. 13 and that might vary by more than 20% or other relatively large amount across the surface of the image transport layer).

Although sometimes illustrated in the context of preconfigured fiber diameters, the undeformed (pre-processed) version of image transport layer 16 may, in general, be provided with any suitable laterally varying attributes to help counteract expected changes due to output expansion and other deformation during molding or other processing. For example, cladding thickness (e.g., the thickness of transparent fiber core coatings and/or light-absorbing fiber core coatings), binder fraction (the fractional area occupied by binder FB on the output surface), core diameter, core material, cladding material, and/or binder material, or other image transport layer attributes may be varied as a function of lateral position in the block of image transport layer material forming the undeformed version of image transport layer 16 (e.g., one or more of these attributes may be decreased at increasing distances from the center of layer 16 towards its peripheral edge). For example, binder fraction may be decreased near to the periphery of layer 16 relative to the center of an undeformed image transport layer. When processed, the output surface in the peripheral area of layer 16 will expand and may, in some configurations, cause the binder fraction to increase. By preconfiguring the image transport layer to include a selectively reduced binder fraction near the periphery, the final processed image transport layer may have a relatively even binder fraction across its lateral dimensions. Fiber core diameter and/or cladding thickness may also be decreased towards the edge of layer 16 (e.g., in arrangements in which core diameters and/or cladding thicknesses are expected to increase during deformation). The narrowing of fiber diameter as a function of increasing distance towards the outermost peripheral edge of layer 16 (which may also make fibers 16F more flexible near the peripheral edge of layer 16 where fibers 16F are deformed) is sometimes described herein as an example, but, in general, any one or more attributes may be varied as a function of lateral position in the undeformed image transport layer material, if desired.

Figure 14:
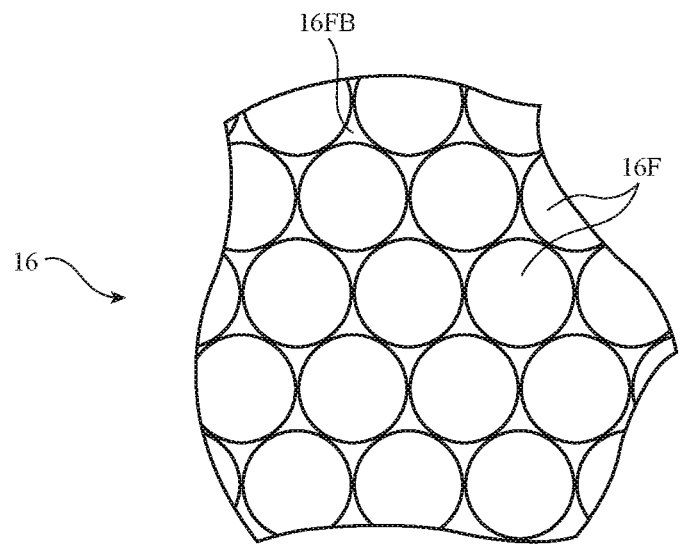
FIG. 14 is a cross-sectional side view of illustrative image transport layer material prior to processing to form an image transport layer in accordance with an embodiment.
Figure 15:
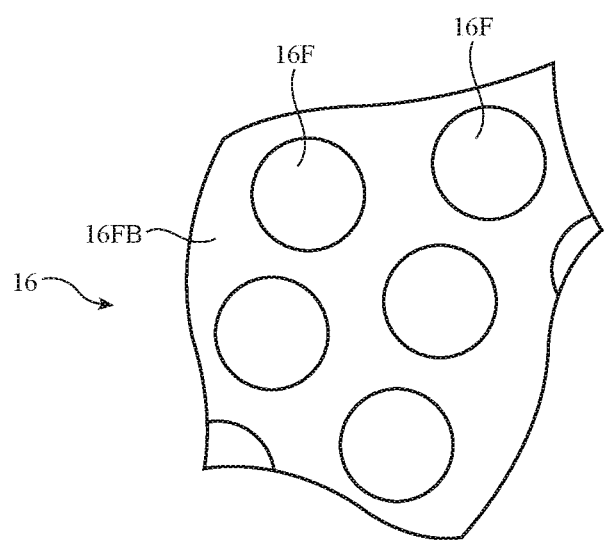
FIG. 15 is a cross-sectional side view of an edge portion of an image transport layer formed by expanding the binder of the layer of FIG. 14 without altering the size of the fibers of the layer of FIG. 14 in accordance with an embodiment.

In the illustrative example of FIG. 14, image transport layer 16 is shown in an undeformed state in which the binder fraction (the fractional surface area containing binder 16FB) is initially low. This is because fibers 16F are initially packed relatively tightly together in the undeformed version of image transport layer 16. Following expansion (e.g., using a piezoelectric actuator, mold, or other tool), the output surface of image transport layer 16 may appear as shown in FIG. 15. In this example, the binder 16FB is expanded while the cores (and, if desired, some or all of the cladding) of fibers 16F are not expanded. The cores and claddings of fibers 16F may, as an example, be formed from glass or cured polymer, whereas binder 16FB may be formed from glass or uncured polymer that is liquid or that is softened sufficiently to flow during molding or other expansion processing operations on the image transport layer. By selectively expanding the area occupied by binder 16FB relative to the total area of output surface of layer 16 while the area associated with fibers 16F (e.g., cores 16F-1 and/or cladding) is held relatively constant, the numerical aperture and other optical attributes of fibers 16F may be preserved (e.g., these optical attributes may be uniform across the output surface after deformation) and defects can be avoided during processing (e.g., the portion of the image displayed on the expanded portions of the output surface of image transport layer 16 may have the same appearance as the portion of the image displayed in central unexpanded portions of the output surface due to the resulting uniformity of the output surface).

Figure 16:
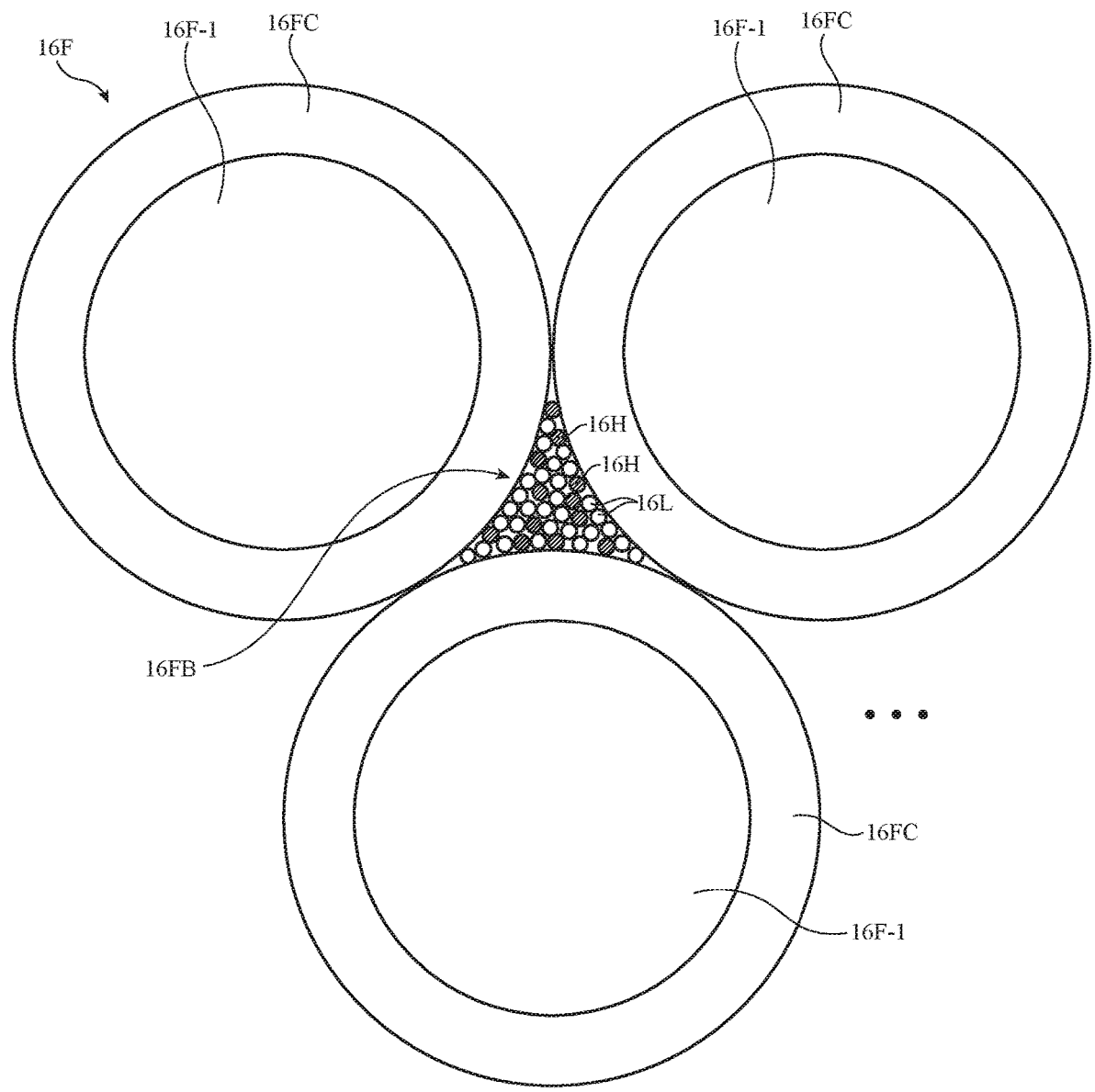
FIG. 16 is a cross-sectional view of a portion of an image transport layer having Anderson localization material serving as binder in interstitial locations between fibers in a coherent fiber bundle in accordance with an embodiment.

If desired, some or all of the binder in image transport layer 16 that joins fibers 16F together may be formed from Anderson localization material. As shown in FIG. 16, for example, binder 16FB may be formed from Anderson localization material such as material having interspersed higher-reflective index filaments 16H and lower refractive index filaments 16L. This material can help guide light in the interstitial spaces between respective fibers 16F and may therefore increase the effective light guiding area of the structures in image transport layer 16 to enhance image transport efficiency. Anderson localization material may be used in the binder located near the edge portions of image transport layer 16 (which are generally deformed during processing and therefore associated with a risk of exhibiting reduced light guiding capabilities) and/or may be used throughout the spaces between fibers 16F in image transport layer 16.

Device 10 may be operated in a system that uses personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. An electronic device, comprising:
a display configured to produce an image; and
an image transport layer configured to receive the image at an input surface and to transport the received image to an output surface, wherein the output surface has a deformed peripheral portion with an area that is expanded relative to an undeformed central portion, wherein the image transport layer comprises fibers with fiber cores, and wherein the fiber cores have diameters that are uniform across the deformed peripheral portion and the undeformed central portion.

2. The electronic device defined in claim 1 wherein the image transport layer comprises binder that fills spaces between the fibers in the image transport layer and wherein a binder fraction associated with the binder is larger in the deformed peripheral portion than in the undeformed central portion.

3. The electronic device defined in claim 1 wherein the image transport layer comprises binder that fills spaces between the fibers in the image transport layer and wherein a binder fraction associated with the binder is uniform between the deformed peripheral portion and the undeformed central portion.

4. The electronic device defined in claim 1 wherein the deformed peripheral portion of the image transport layer has a curved profile.

5. The electronic device defined in claim 1 further comprising Anderson localization material between the fibers.

6. The electronic device defined in claim 1 wherein the fibers have claddings and wherein the claddings have a thickness that is uniform across the deformed peripheral portion and the undeformed central portion.

7. The electronic device defined in claim 1 wherein the fibers comprise glass fibers deformed using heat.

8. The electronic device defined in claim 1 wherein the fibers comprise polymer fibers deformed using an electrically controlled actuator.

9. An electronic device, comprising:
a display configured to produce an image; and
an image transport layer configured to receive the image at an input surface and to transport the received image to an output surface, wherein the image transport layer comprises a coherent fiber bundle having optical fibers and having Anderson localization material between the optical fibers.

10. The electronic device defined in claim 9 wherein the optical fibers comprise polymer fibers, wherein the electronic device has a protective layer that overlaps the output surface, and wherein the protective layer is selected from the group consisting of: a glass protective layer and a crystalline protective layer.

11. The electronic device defined in claim 9 wherein the optical fibers comprise glass fibers.

12. The electronic device defined in claim 9 wherein the output surface has a deformed peripheral portion with an area that is expanded relative to an undeformed central portion.

13. The electronic device defined in claim 12 wherein the optical fibers have diameters that are uniform across the peripheral portion and the central portion.

14. The electronic device defined in claim 13 wherein the optical fibers have cores with diameters that are uniform across the peripheral portion and the central portion.

15. The electronic device defined in claim 13 wherein the optical fibers have fiber cores and claddings and wherein the claddings of the optical fibers have a thickness that is uniform across the peripheral portion and the central portion.

16. A method of forming an image transport layer with an input surface configured to receive an image from a display and an output surface to which the received image is provided, the method comprising:
    forming an undeformed image transport layer having an attribute that varies as a function of lateral distance across the undeformed image transport layer; and
    deforming the undeformed image transport layer to form the image transport layer in which the attribute varies less as a function of lateral distance across the output surface than the attribute varies as a function of the lateral distance across the undeformed image transport layer.

17. The method defined in claim 16 wherein the image transport layer has fibers with cores and claddings and has binder between the fibers.

18. The method defined in claim 17 wherein the attribute comprises a diameter associated with the cores and wherein forming the undeformed image transport layer comprises varying the diameter as a function of the lateral distance across the undeformed image transport layer.

19. The method defined in claim 17 wherein the attribute comprises a diameter associated with the cores and wherein forming the undeformed image transport layer comprises decreasing the diameter as a function of increasing distance away from a center of the undeformed image transport layer.

20. The method defined in claim 17 wherein the attribute comprises a cladding thickness associated with the claddings and wherein forming the undeformed image transport layer comprises decreasing the cladding thickness as a function of increasing distance away from a center of the undeformed image transport layer.

21. The method defined in claim 17 wherein the attribute comprises a binder fraction associated with the binder and wherein forming the undeformed image transport layer comprises decreasing the binder fraction as a function of increasing distance away from a center of the undeformed image transport layer.

* * * * *